May 1, 1945.  C. E. FRUDDEN  2,375,167

VEHICLE STEERING TRUCK AND METHOD OF MAKING SAME

Filed July 18, 1941  2 Sheets-Sheet 1

May 1, 1945.  C. E. FRUDDEN  2,375,167
VEHICLE STEERING TRUCK AND METHOD OF MAKING SAME
Filed July 18, 1941   2 Sheets-Sheet 2

Inventor
C. E. Frudden.
by
Attorney

Patented May 1, 1945

2,375,167

UNITED STATES PATENT OFFICE 2,375,167

VEHICLE STEERING TRUCK AND METHOD OF MAKING SAME

Conrad E. Frudden, Wauwatosa, Wis., assignor to Allis-Chalmers Manufacturing Company, Milwaukee, Wis., a corporation of Delaware Application July 18, 1941, Serial No. 402,918

6 Claims. (Cl. 280—96.1)

The invention relates to improvements in the construction and manufacture of steering trucks for vehicles, particularly of the type in which a pair of supporting wheels are rotatably mounted on a rigid axle, and in which steering is effected by pivotal adjustment of the axle about an upright axis between said wheels.

The mentioned steering principle is common in tractors which have a pair of steerable front wheels, and particularly where such front wheels are arranged in close proximity to each other, as in farm tractors.

It is an object of the invention to provide an improved vehicle steering truck in which a pair of wheels are rotatably mounted on a steerable axle, and in which an upright steering spindle is secured to a portion of said axle between the wheels.

More specifically, it is an object of the invention to provide an improved construction and method of manufacture of the turnable support on which the wheels are mounted, that is, of the axle and spindle assembly which is steerably mounted on a stationary part of the steering truck.

Another and important object of the invention is to obtain a saving of costs in the production of the turnable wheel support, as compared with heretofore employed constructions and methods of manufacture, and to effect such saving of costs without sacrificing strength and other requirements, or features which are desirable from a performance standpoint in operation of the vehicle.

In steering trucks for farm tractors which have a pair of closely spaced front wheels such wheels are preferably mounted to rotate in downwardly converging planes, the purpose being to provide a relatively narrow spacing of the wheels below the axle and a relatively wide spacing of the wheels above the axle. The relatively narrow spacing of the wheels below the axle enables them to run in a narrow space between two plant rows, while the relatively wide spacing of the wheels above the axle provides room for the steering spindle and for a downward extension of the stationary part of the steering truck on which the steering spindle is mounted.

For convenience of the operator in driving the tractor it is further desirable that when he swings the steerable wheels to the right or left for steering, the wheels should have a tendency to return automatically to a straight ahead position, and for that purpose the axis on which the steering spindle turns is preferably arranged a short distance ahead of the wheel centers, so that, when the tractor is in motion, the steerable wheels are subject to swivel movement like the wheel of a caster.

The improved construction of the axle and spindle assembly, and the improved method of its manufacture, as contemplated by the invention, are particularly suited to provide for the mentioned two features which are desirable in a farm tractor, namely, for the inclined mounting of the wheels which affords a narrow tread between plant rows and clearance for the mounting of the steering spindle, and for the caster effect which tends to hold the wheels on a straight ahead course.

As a first step towards providing a relatively inexpensive axle and spindle assembly incorporating the mentioned two features, the invention contemplates to machine a straight axle blank of standard bar stock in a lathe or screw machine to form wheel spindles at opposite ends of the blank, the axes of the wheel spindles coinciding substantially with the longitudinal axis of the blank. The blank is longer than the combined axial lengths of the spindles, that is, it has an intermediate portion, of ordinarily appreciable length between the spindles, and for reasons of economy the machining in the lathe or screw machine is preferably limited to the end portions of the blank which require machining to form the spindles thereon, and such limited machining therefore leaves an intermediate portion of the blank unmachined.

After the wheel spindles are formed on the blank it is bent to provide for the required angularity between the axes of the wheel spindles which angularity causes the wheels, when mounted on said spindles, to turn in the mentioned relatively converging planes. Preferably, the blank is bent cold and about a single center, which can be done very cheaply. In order to facilitate the bending, the axle blank may be weakened locally between the wheel spindles, as by cutting a transverse groove into it from one side. If such a groove is cut into the axle blank, the bend is preferably performed in the direction which causes a widening of the groove at the side of the blank from which the groove is cut into it.

The steering spindle is formed as a separate piece from the axle, which makes it possible to conveniently perform any machining operations on the steering spindle, which may be necessary or desirable, prior to its assembly with the axle. Likewise, the wheel spindles of the axle may conveniently be shaped in the mentioned manner prior to the assembly of the axle with the steering spindle, and the bending of the axle blank is also preferably performed prior to said assembly.

As stated, a transverse groove may be cut into the axle to facilitate the bending thereof for angling the axes of the wheel spindles, and the steering spindle may be connected with such a grooved axle, after it is bent, in a simple and inexpensive manner which affords not only adequate strength of the axle and spindle assembly to withstand the substantial loads to which it is subjected in operation of the tractor, but which manner of connection also affords the mentioned caster effect which tends to hold the wheels on a straight ahead course. For that purpose the groove is made so that after bending of the axle it tapers inwardly from the surface of the axle, the converging side walls of the groove being preferably straight, and one end of the steering spindle is tapered to conform substantially with the taper of the groove. The tapered end of the steering spindle is then set into the axle groove in an offset position relative to the axle, that is, in a position in which the axis of the steering spindle is spaced transversely from the axes of the angled wheel spindles. The cross-section of the bar stock from which the axle is made affords a sufficient thickness of the axle at the groove so that, when the axis of the steering spindle is offset from the axes of the wheel spindles a proper distance to afford the desired caster effect, at least part of the tapered end of the steering spindle is received within the groove.

After the steering spindle has been arranged relative to the axle in the mentioned offset position, with its axis spaced from the axes of the wheel spindles a proper distance to afford the desired caster effect and with at least part of its tapered end received within the axle groove, the axle and spindle are then directly united by fusion of metal, preferably by welding. The described arrangement of the axle and steering spindle affords suitable corners between relatively adjacent surface portions of the axle and spindle for depositing a fillet of fused metal therein, and a strong fused metal connection between the axle and steering spindle may therefore be made conveniently and at relatively low costs.

The local weakening of the axle, as by cutting a groove into it, makes it possible to bend it with relatively little effort for angling the wheel spindles, but such angling may also be accomplished by bending the axle without prior local weakening of an intermediate portion thereof. As pointed out hereinbefore, the machining of the axle blank in a lathe or screw machine preferably leaves the intermediate portion of the axle between the wheel spindles unmachined, and the axle, if bent without prior local weakening, will have an intermediate distorted portion of the full thickness, or of substantially the full thickness, of the bar stock from which the axle blank is made. In that case the steering spindle may again be connected to the bent axle, according to the invention, in a simple and inexpensive manner which affords adequate strength of the completed axle and spindle assembly and also provides for the mentioned caster effect to hold the wheels on a straight ahead course. For instance, a transverse groove may be formed at one end of the steering spindle, which groove conforms substantially with the profile of the intermediate axle portion of full thickness, and the grooved portion of the steering spindle may be connected to said axle portion by welding. By suitably matching the spindle and axle provision may be made for spacing the axis of the steering spindle from the axes of the wheel spindles a proper amount to afford the mentioned caster effect of the wheels. That is, when the axle abuts the matched portion of the steering spindle, contact of the spindle and axle insures the desired proper spacing of the axis of the steering spindle from the axes of the wheel spindles, and the desired location of the axle longitudinally of the steering spindle. After the spindle and axle have been arranged in the mentioned abutting relation to each other, they are directly united by a fused metal connection between the matched portions thereof. The abutting arrangement of the grooved steering spindle relative to the full thickness of the axle, like the abutting arrangement of the tapered steering spindle relative to the grooved axle which has been referred to hereinbefore, affords suitable corners between relatively adjacent surface portions of the axle and spindle for depositing a fillet of fused metal therein, as by welding.

Generally stated, the invention contemplates a castering support for a pair of wheels, comprising an axle and a steering spindle; in which the axle has opposite wheel spindles; in which the steering spindle is rotatable about an axis offset from the axes of the wheel spindles; in which the axle and steering spindle have matched integral portions in the space between the axis of the steering spindle and a plane extending parallel to the axis of the steering spindle through the axes of the wheel spindles; and in which a fused metal connection unites the axle and steering spindle at said matched portions thereof.

The foregoing and other objects and advantages of the invention will become more fully apparent from the following description of several embodiments of the invention illustrated in the accompanying drawings. Referring to the drawings, in which like reference characters designate the same or similar parts in the several views.

Figure 1:
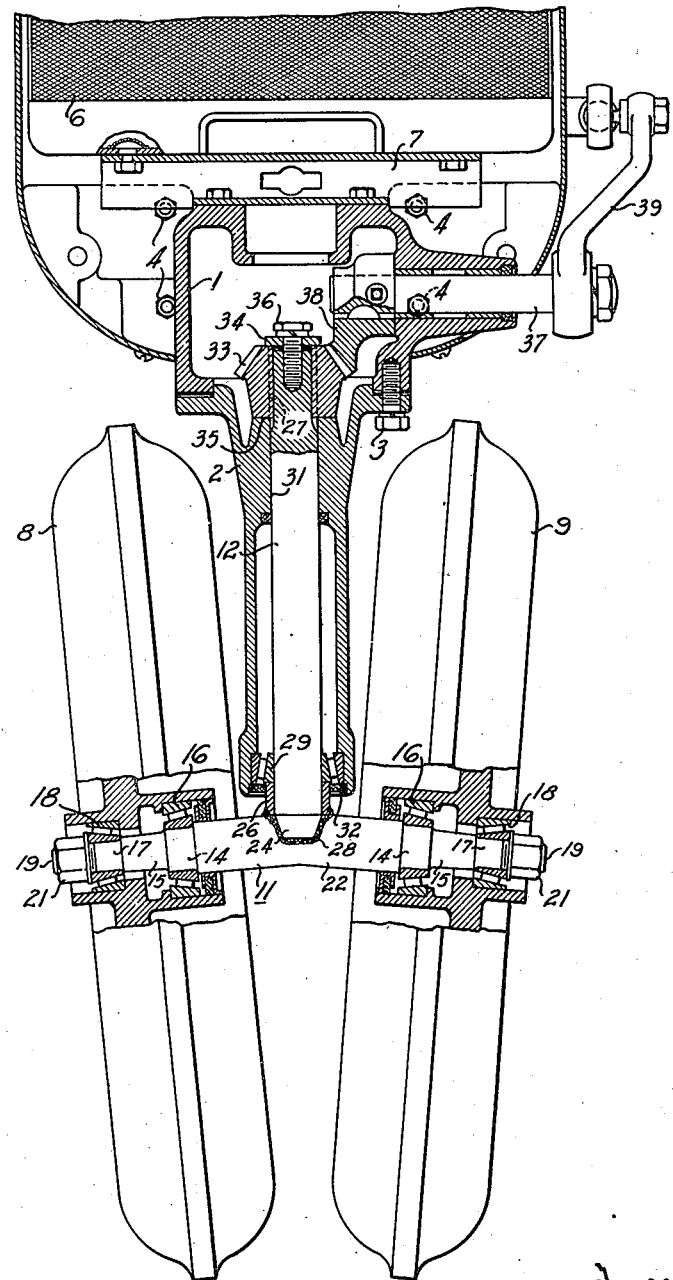
Fig. 1 is a sectional front view of a steering truck for a farm tractor.

Referring to Fig. 1, the stationary part of the steering truck comprises a housing section 1 and a spindle guide 2 which extends downwardly from the housing section 1 and is secured thereto by a series of bolts 3. Bolts 4 in lateral wing portions of the housing section 1 serve to hold the stationary part of the steering truck in fixed position on the tractor, and a radiator 6 which forms part of the tractor is mounted on the upper housing section 1 by means of a bracket structure 7.

The stationary part of the steering truck is supported on a pair of rubber tired supporting wheels 8 and 9 by means of an axle and spindle assembly which comprises a cambered axle 11 and a steering spindle 12, and which assembly is constructed and manufactured as follows.

Figure 2:
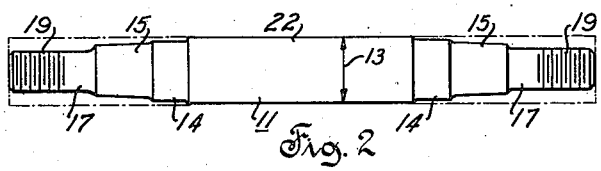
Figs. 2 to 9 illustrate various stages of manufacture of the axle and spindle assembly of the steering truck shown in Fig. 1.

Referring to Fig. 2, this figure shows the axle 11 in an initial stage of its manufacture. The dash-dotted lines in Fig. 2 indicate the outline of a blank which is obtained by cutting a piece of suitable length from a round bar of cold rolled steel, such bar being straight as it comes from the mill, and its diameter being indicated at 13 in Fig. 2. The ends of the straight axle blank are turned down in a lathe or screw machine to form axially alined spindle portions for the wheels 8 and 9 thereon, the alined axes of the spindle portions coinciding substantially with the longitudinal axis of the blank, and each spindle portion comprising a seat 14 for the inner race of a roller bearing 16 shown in Fig. 1 and a seat 17 for the inner race of another roller bearing 18 which is likewise shown in Fig. 1. The seats 14 and 17 are connected by a tapered portion 15 therebetween, and each spindle terminates in a threaded portion 19 for the reception of a retaining nut 21 shown in Fig. 1. The machining of the blank in the lathe or screw machine is preferably limited to the end portions which require machining to form the spindles and screw threads, while an intermediate portion 22 of the blank remains unmachined.

Figure 6:
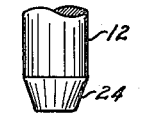
Figure 3:
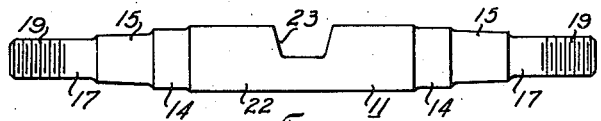

After the forming of the spindle portions on the blank, a transverse groove 23 is cut into the intermediate portion 22 of the blank at one side thereof, the groove extending in the direction of its length transversely of the axle 11, as shown in Figs. 3 and 6. The groove 23 has relatively inclined straight side walls and a depth approximately equal to the radius of the bar stock from which the blank is made.

Figure 4:
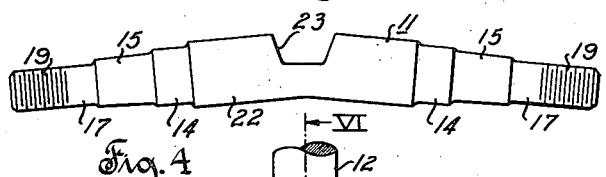

After the formation of the spindle portions and the groove, the axle is bent at the portion thereof which has been weakened by the groove 23, as shown in Fig. 4, to dispose the axes of the spindle portions angularly relative to each other. The weakening of the intermediate portion 22 of the axle, by cutting the groove 23 into it, makes it possible to bend the axle, while cold, into the shape shown in Fig. 4 with relatively little effort, and the direction of said bending is such as to increase the width of the groove at the periphery of the axle portion 22. In other words, the axle bar is bent at its intermediate portion so as to enlarge the groove in the direction of its width.

Figure 8:
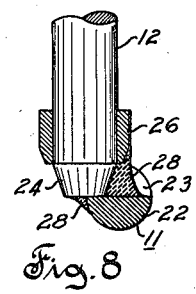
Figure 5:
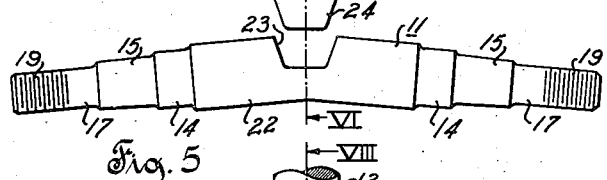

The steering spindle 12 has a conical end portion 24 as shown in Figs. 5 and 6 of a taper corresponding substantially to the taper at which the side walls of the groove 23 are disposed relative to each other by the mentioned bending of the axle. The conical end of the steering spindle 12 is set into the groove 23 of the axle in an offset position relative to the latter, as shown in Fig. 8, in which offset position the axis of the steering spindle is spaced a short distance from the axes of the spindle portions of the bent axle 11, and about one-half of the conical end 24 of the steering spindle, at one side of its axis, is received within the groove 23 of the axle. The relatively angled axes of the spindle portions of the axle extend in a common plane, and in the mentioned offset position of the steering spindle its axis extends parallel to said plane in a direction bisecting the angle between the axes of the wheel spindles.

A short sleeve 26 is slid over a portion of the steering spindle immediately adjacent to the tapered end 24 thereof, prior to the final fastening of the steering spindle to the axle. Preparatory to such final fastening the axle and steering spindle are arranged in the relative position in which they are shown in Figs. 7, 8 and 9, that is, the steering spindle is placed to extend longitudinally into the groove 23 in the direction of the depth of the latter.

Figure 9:
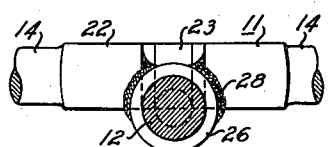
Figure 7:
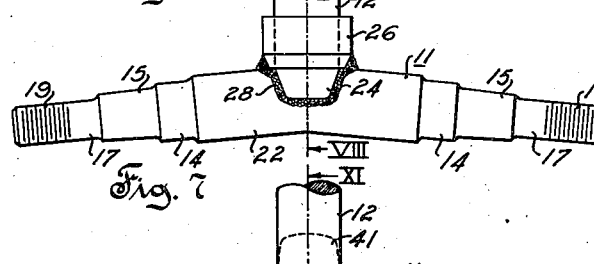

After the steering spindle 12, with the sleeve 26 placed thereon, has been arranged relative to the axle 11 in the position indicated in Figs. 7, 8 and 9, the spindle and axle are directly united by a continuous fillet weld indicated at 28 in Figs. 7, 8 and 9. The fillet weld extends all around the intersection of the spindle 12 with the axle 11, that is, along the end face of the spindle taper 24, then longitudinally of the steering spindle and peripherally of the axle, at opposite sides of the spindle, along the front corners between the tapered end 24 and the cylindrical outer surface portions of the intermediate axle portion 22, then at opposite sides of the groove 23 and peripherally of the axle 11 along the lower end of the sleeve 26 and the adjacent upper surface portions of the axle 11, and finally into the space of the groove 23 which is left open by the offsetting of the steering spindle 12 relative to the axle 11, as may best be seen from Figs. 8 and 9. A rearward portion of the steering spindle which is united with the axle by the portion of the fillet weld within the groove, and a forward portion of the steering spindle which is united with the axle by the portions of the fillet weld along the mentioned front corners, are spaced from each other in the longitudinal direction of the groove 23. The fillet weld, therefore, directly units the axle and steering spindle within the groove and at portions of the steering spindle which are spaced from each other in the longitudinal direction of the groove. The end of the sleeve adjacent to the axle 11 is tapered to facilitate the deposit of welded material uniting the sleeve 26 with the axle 11 and with the lower end of the steering spindle 12.

In the steering truck as shown in Fig. 1, the steering spindle 12 is rotatably mounted in the spindle guide 2 by means of a conical roller bearing 29 in a lower part of the spindle guide 2, and by means of a running fit of the steering spindle in an axial bore 31 in an upper part of the spindle guide. The mentioned sleeve 26 provides an axial abutment for the inner race of the roller bearing 29, which inner race is press-fitted upon the steering spindle. A seal 32 is arranged below the roller bearing 29 between the sleeve 26 and a skirt portion at the lower end of the spindle guide 2. The spindle 12 is thus mounted on the stationary part of the steering truck for rotation about a substantially vertical axis, and the united axle and spindle are so arranged in the steering truck that, due to the offset relation between the spindle 12 and the axle 11, the axis of rotation of the spindle 12 is spaced a short distance forwardly from the axes of the wheel spindles on the axle 11. When the tractor is in motion, the wheels 8 and 9 will therefore be subject to swivel movement like the wheel of a caster.

The upper end of the steering spindle 12 projects into the housing section 1, and formed on the projecting portion of the steering spindle are a series of axial splines 27 for the mounting of a bevel gear 33 on the spindle 12, the hub of the bevel gear having internal splines fitting the splines 27 of the steering spindle. The bevel gear 33 bears at one side upon a thrust surface 35 of the spindle guide 2, and at the other side of the bevel gear a washer 34 extends over the hub of the bevel gear 33 and is retained on the spindle 12 by means of a bolt 36. In order to steer the wheels 8 and 9 to the right or left, rotary movement is transmitted to the steering spindle 12 by means of a transverse steering crank 37 which has a bevel gear segment 38 in mesh with the bevel gear 33 within the housing section 1, and an outer crank arm 39 for rocking the steering crank about its axis. The mechanism for transmitting steering movements to the steering spindle by means of the transversely disposed steering crank 37 is the subject of a copending application, Serial No. 402,296, filed on July 14, 1941, by Walter F. Strehlow for "Tractor," and now Patent No. 2,301,152, dated November 3, 1942.

The steering spindle 12 is made from round bar stock of cold rolled steel which, after being cut to a proper length, is suitably machined to form the conical portion 24 at one end of the steering spindle, the axial splines 27 at the other end thereof, and a smooth, preferably ground surface at an intermediate portion of the spindle affording a rotary running fit of the spindle in the bore 31 of the spindle guide 2. Another smooth, preferably ground surface is formed near the lower end of the steering spindle for a press-fit with the sleeve 26 and with the inner race of the roller bearing 29. For convenience of manufacture the mentioned smooth surfaces, the splines 27, and the tapped hole for the reception of the bolt 36 are preferably formed on the spindle 12 before it is welded to the axle 11.

Referring again to Figs. 7, 8 and 9, it will be noted that the described welded connection between the axle 11 and the steering spindle 12 is such as to compensate substantially for the weakening of the axle which is caused by the cutting of the groove 23 into the intermediate portion thereof. The tapered end of the steering spindle 12 coacts with the adjacent portions of the axle to take up compression forces to which the upper half of the axle is subjected due to the downwardly directed load components transmitted thereto through the steering spindle 12 and due to the upwardly directed load components transmitted thereto through the wheels 8 and 9.

Shrinkage of the axle during the cooling period after the fillet weld 28 has been applied causes the bent axle to straighten out to some extent, that is, the angle at which the axes of the wheel spindles are disposed relative to each other slightly increases, at the lower side of the axle, during the cooling period after welding. In order to obtain a predetermined angle between the axes of the wheel spindles in the completed axle and spindle assembly, it is therefore necessary to bend the axle, prior to its connection with the steering spindle, somewhat beyond said predetermined angle. If the desired camber of the axle, that is, the angle between the axes of the wheel spindles in the completed assembly is, for instance, 170 degrees, the axle is preferably bent, prior to its connection with the steering spindle, to an angle of about 165 degrees.

A modified construction and method of manufacture of the axle and spindle assembly is illustrated in Figs. 10 to 14 of the drawings. In making the modified axle and spindle assembly, an axle blank like that indicated by the dash-dotted lines in Fig. 2, is used and machined at its opposite ends to form the wheel spindles thereon as described hereinbefore in connection with Fig. 2. After the forming of the wheel spindles on the axle blank, the axle is then bent, without locally weakening the intermediate portion 22 thereof, into the shape shown in Fig. 10, and the portion 22 of the axle will therefore have, at its center where the bend occurs, the full thickness, or substantially the full thickness, of the bar stock from which the blank is cut.

Figure 11:
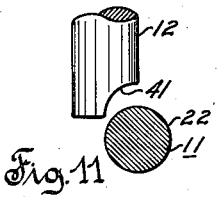
Figs. 10 to 14 illustrate various stages of manufacture of a modified axle and spindle assembly.
Figure 10:
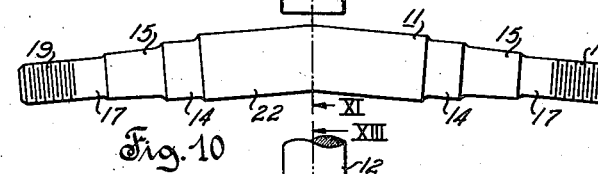
Figure 13:
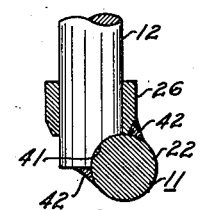
Figure 12:
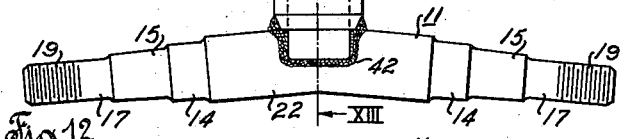
Figure 14:
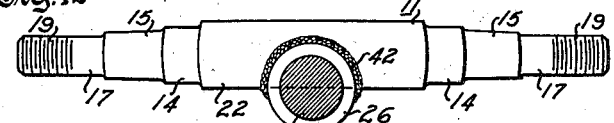

The lower end of the steering spindle 12, as shown in Figs. 10 and 11, is shaped to match the profile of the intermediate bent portion of the axle by the provision of a transverse groove 41 thereon. The groove 41 forms an arcuate recess in the lower end of the spindle, the radius of which is substantially the same as the radius of the bar stock from which the axle is made so that the steering spindle and axle may be placed into abutting relation to each other as shown in Figs. 12 and 13. The depth of the groove 41 is such that when the steering spindle and axle are arranged in the abutting position shown in Fig. 13, the axis of the steering spindle 12 is spaced from the axes of the wheel spindles a proper distance to afford the mentioned caster effect of the wheels 8 and 9 in operation of the tractor. A sleeve 26, like the one shown in Figs. 7 and 8, is placed on the steering spindle, as explained hereinbefore in connection with the axle and spindle assembly shown in Fig. 1, and the modified assembly is completed by welding the parts together in the relative position in which they are shown in Figs. 12, 13 and 14. As shown in these figures, a continuous fillet 42 of welded material extends all around the intersection of the steering spindle 12 with the axle 11, a lower part of the fillet being deposited in the corner between the lower end face of the steering spindle 12 and the adjacent circumferential surface of the axle, and an upper part of the fillet being deposited in the corner between the lower tapered edge of the sleeve 26 and the adjacent circumferential surface portions of the axle. Continuing from the lower towards the upper part of the fillet 42 extends longitudinally of the steering spindle 12 and peripherally of the axle 11 within the corners between relatively adjacent portions of the steering spindle and axle at the opposite ends of the groove 41.

It will be noted that in the modified construction shown in Figs. 10 to 14, as well as in the construction shown in Figs. 1 to 9, the fused metal connection unites relatively adjacent portions of the sleeve 26 and axle 11, and also relatively adjacent portions of the steering spindle 12 and axle 11 below the sleeve 26. In both embodiments of the invention an upper part of the fused metal connection unites relatively adjacent portions of the steering spindle, axle and sleeve at the lower end of the latter, and a lower part of the fused metal connection unites relatively adjacent portions of the steering spindle and axle below the sleeve 26.

The modified construction shown in Figs. 12 to 14 has an advantage over the construction shown in Figs. 7 to 9 in that it saves part of the relatively large amount of welded material which is deposited in the groove 23 of the axle as shown in Figs. 8 and 9, and therefore may be manufactured at a somewhat lower cost.

While in the foregoing two embodiments of the invention have been described in detail with reference to the drawings, it should be understood that it is not intended to limit the invention to the exact details of construction and manufacture explained hereinbefore, for various modifications within the scope of the appended claims may occur to persons skilled in the art.

It is claimed and desired to secure by Letters Patent:

1. In a vehicle steering truck, a pair of supporting wheels, and a castering support for said wheels comprising an axle member having opposite spindle portions within said wheels, a spindle member between said wheels rotatable about an axis offset transversely of the axes of said spindle portions, one of said members having a groove in an integral portion thereof, and the other of said members having an integral portion matching said groove, and a fused metal connection between said integral portions of said members retaining one within said groove of the other.

2. In a vehicle steering truck, a pair of supporting wheels, and a castering support for said wheels comprising a cambered axle having opposite spindle portions within said wheels, a spindle member rotatable on an axis extending, in transversely offset relation to the axes of said spindle portions, within a plane bisecting the angle between the axes of said spindle portions, one of said members having a groove in an integral portion thereof, and the other of said members having an integral portion matching said groove, and a fused metal connection between said integral portions of said members retaining one within said groove of the other.

3. In a vehicle steering truck, a pair of supporting wheels, an axle member having opposite spindle portions within said wheels, a spindle member between said wheels rotatable about an axis offset from and extending transversely of the axes of said spindle portions, said axle and spindle members having matched integral portions in the space between said axis of said spindle member and a plane extending parallel to the axis of said spindle member through the axes of said spindle portions, and a fillet of fused metal directly uniting said axle and spindle members at said matched integral portions thereof.

4. In a vehicle steering truck, a pair of supporting wheels, an axle having opposite spindle portions within said wheels and a groove at its upper side extending, at an intermediate portion of said axle, from one side of a vertical plane through the axes of said spindle portions to the other side of said plane, a steering spindle having an end portion within said groove at said one side of said plane, and a fillet of fused metal directly uniting said axle and steering spindle at said groove.

5. An axle and spindle assembly comprising a vertical steering spindle, an annular member surrounding a portion of said steering spindle above the lower end thereof, an axle offset from the axis of said steering spindle and extending transversely thereof below said annular member, and a fused metal connection between relatively adjacent portions of said annular member and said axle, and between relatively adjacent portions of said steering spindle and axle below said annular member.

6. An axle and spindle assembly comprising a vertical steering spindle, an annular member surrounding a portion of said steering spindle spaced from the lower end thereof, an axle offset from the axis of said steering spindle and extending transversely thereof below said annular member, and a fused metal connection between relatively adjacent portions of said steering spindle, axle and annular member at the lower end of the latter and between relatively adjacent portions of said steering spindle and axle below said annular member.

CONRAD E. FRUDDEN.